Aug. 1, 1961  W. B. GRANDJEAN  2,994,712
PROCESSING ALKYLLEAD SYNTHESIS MIXTURES
Filed June 2, 1958
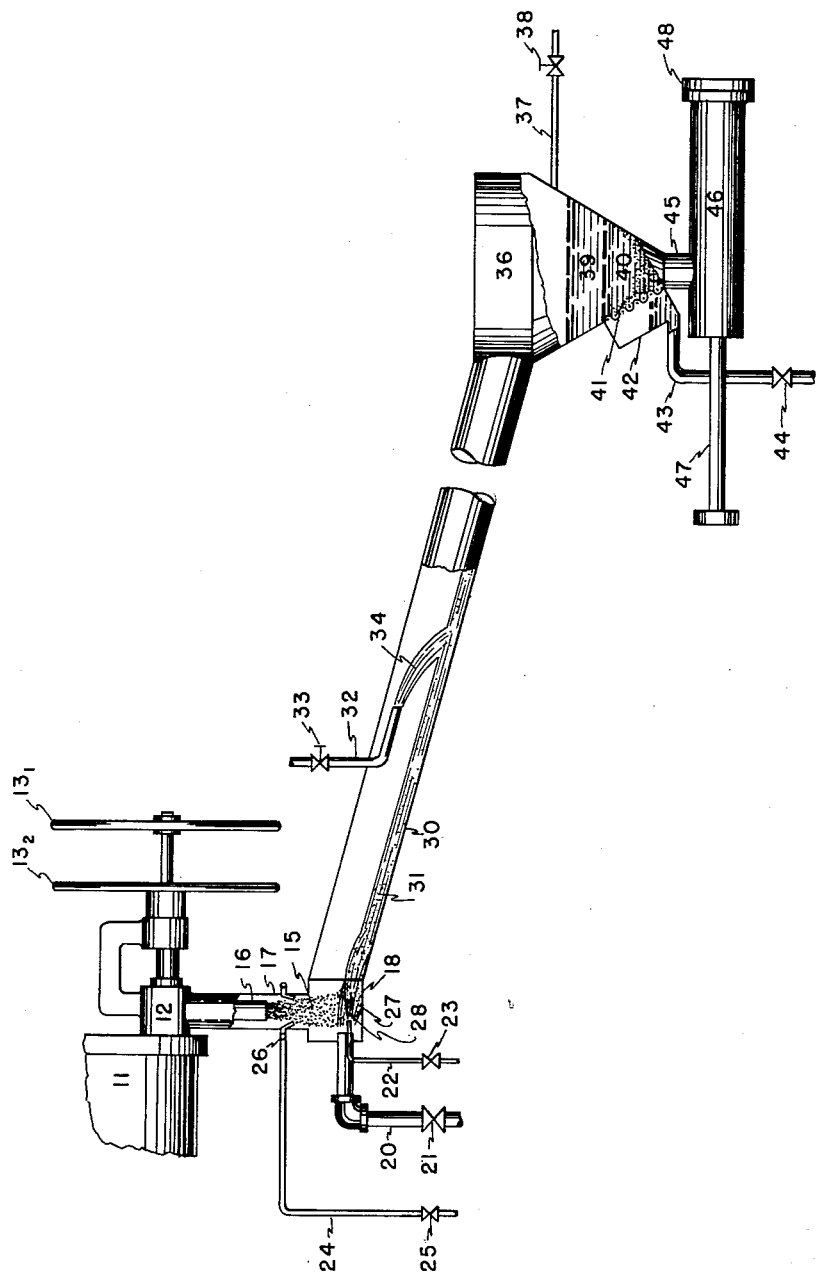

United States Patent Office 2,994,712
Patented Aug. 1, 1961

2,994,712
PROCESSING ALKYLLEAD SYNTHESIS
MIXTURES
William B. Grandjean, Baton Rouge, La., assignor to
Ethyl Corporation, New York, N.Y., a corporation of
Delaware
Filed June 2, 1958, Ser. No. 739,124
2 Claims. (Cl. 260—437)

This invention relates to the manufacture of tetraalkyllead compounds, especially tetraethyllead. More particularly, the invention relates to the manufacture of tetraalkyllead compounds utilizing a reaction characterized in that the products of the synthesis reaction, or "reaction mass" is generally in the form of a substantially dry, sandy or granular, mass. More particularly, the invention relates to a new and novel treatment and transport method for treating said reaction mass prior to ultimate recovery operations.

Manufacture of tetraalkyllead compounds, of which tetraethyllead is the prime example, is conventionally carried out by reacting an alloy of lead, i.e. lead alloyed with one or more alkali metals, with an alkylating agent. Such reactions, are generally illustrated by the following equation representing the commercial reaction employed for the synthesis of tetraethyllead:

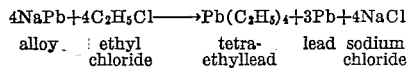

$$4\text{NaPb} + 4\text{C}_2\text{H}_5\text{Cl} \longrightarrow \text{Pb}(\text{C}_2\text{H}_5)_4 + 3\text{Pb} + 4\text{NaCl}$$

alloy    ethyl      tetra-    lead   sodium
          chloride    ethyllead         chloride It is seen, from the foregoing equation, that completion of the foregoing reaction will result in the release, in the reaction products or "reaction mass," of a substantial amount of unreacted or excess lead. In fact, in conventional practice, with a high yield or degree of completion of the foregoing reaction as on the order of about 85 percent, a typical reaction mass composition is as follows:

| Component: | Weight percentage |
|---|---|
| Tetraethyllead | 24 |
| NaCl | 20 |
| Lead | 55 |
| Ethyl chloride and other minor components | 1 |

A reaction mass of the composition generally given above is, as already mentioned, an apparently dry, sandy or granular material. Despite the presence of appreciable quantities of tetraethyllead, which is a normally liquid material, this appearance is retained, the tetraethyllead being, apparently, adsorbed on the surfaces of the finely divided solids present.

Recovery of the metallic lead produced is essential to the commercial success of the operation. A successful recovery step necessarily involves treatment, transport and separation of the individual components of the reaction mass.

Various reaction techniques have been proposed, to provide a reaction mass with physical characteristics more suitable for a recovery operation. For example, it has been proposed to provide a reaction mass which has the character of a relatively thin slurry. An example of such a process is the Neher et al. process, U.S. Patent 2,644,827. The Neher et al. technique circumvents certain difficulties arising from the reaction technique initially described above, viz., the formation of a dry reaction mass. However, the Neher et al. method necessarily involves the use of a high weight excess of liquid ethyl chloride ethylating agent, and consequently the process must provide extensive means for the recovery thereof.

The principal defect of an overall process employing a synthesis operation characterized by formation of a dry reaction mass has arisen during the recovery operation. It is found that the solids of the reaction mass of this type have a profound tendency for uncontrolled agglomeration, which has been responsible for great difficulties in the transport and recovery operations. The normal operation following synthesis has been to transport a reaction mass to a recovery operation such as to a steam distillation unit (see for example U.S. 2,723,227) or, alternatively, for treating by leaching out the tetraethyllead with an organic solvent and concurrently stratifying the several components of the system into a multilayer, heterogeneous system. When a steam distillation operation is provided, normally anti-agglomerants or "still aids" have been provided. These materials can be of several different types, soluble salts of iron and sodium thiosulfate being particularly effective. Although these anti-agglomerants have been highly effective in eliminating agglomerating difficulties in steam distillation, they in turn introduce other problems in the subsequent smelting operations which are necessary to recoup the substantial quantity of lead represented by the free lead produced as per the equation above.

Accordingly, a great need has existed for improving the susceptibility of reaction mass systems to transport, and the tetraalkyllead therein to recovery, without depriving an overall process of the advantages of a reaction of the type indicated, viz., the employment of a limited excess of ethyl chloride and formation of a dry reaction mass. More particularly, a potent need existed for a simple and effective means of transporting and treating dry reaction masses and for providing full control of agglomeration. In addition, a need has existed for providing control of the agglomerant tendencies of reaction masses for the purposes already indicated, and also to permit reduction or elimination of additives which tend to increase the difficulty of melting the lead for the recovery thereof.

A principal object of the present invention is then, to provide a process for the improved manufacture of tetraalkyllead liquid compounds. More specifically, an object of the present invention is to provide improvements in the process of tetraethyllead synthesis and recovery wherein the process is characterized by the formation of a dry reaction mass having no significant amount of liquid tetraalkyllead products discernible. Even more particularly, an object of the present invention is to provide an improved transport and treatment step of a high solids reaction mass which reduces or minimizes the need for any anti-agglomerant additives and permits the smelting of the lead component and recovery thereof at appreciably lower temperatures than heretofore encountered. Still another object of the present invention is to provide an improved transport and treating step applicable to high solids reaction mass which permits a manufacture and recovery process which eliminates the need for the steam distillation operation. Other objects will appear hereinafter.

The general method of the present process involves the generation of a high solids reaction mass, and, upon completion of the reaction, the discharge of the reaction mass from the reaction zone as a freely falling stream. Generally, during freefall, contact of the solids with wall surfaces of conduits is minimized, although some contact will occur immediately on discharge from the reacting vessel. It should be noted that an enclosed system is necessary in the process because the lead metal solids of a reaction mass are pyrophoric, owing to the extremely high surface area of the lead metal solids.

After a drop, the proportions of which are not particularly critical, the reaction mass is met with a laterally directed stream of water or aqueous liquid, the proportions and attributes of this stream having certain essential characteristics. Firstly, the said aqueous stream is provided with sufficiently high kinetic energy and mass relative to the mass of the reaction mass being treated, that the sub-divided solids are so rapidly treated that the agglomerative tendency is drastically altered and reduced. This feature is the surprising discovery of the process, i.e., that treatment of the reaction mass with a moving aqueous stream, under the proper set of conditions, is sufficient to permit full control of the agglomerative tendency of the solids of reaction mass. The attributes of the stream more explicitly defined are that it must possess kinetic energy equivalent to at least about 30 foot-pounds per pound of reaction mass, and in addition an absolute weight ratio on the order of at least about 3.2 pounds of water per pound of reaction mass. The combined streams, including the reaction mass components already generally described and the aqueous liquid, are passed to a conduit, which normally is slightly inclined to the horizontal, to a further recovery operation. Further recovery can be any of several methods. For example, the tetraethyllead is already in part separated as a discernible liquid phase by the present treating process, and stratification and draw-off of the tetraethyllead layer is perfectly feasible. The resultant aqueous lead solids sludge, having residual and appreciable quantities of tetraethyllead therein, can be treated by an extrusion recovery operation for further segregation of the lead and lead solids and liquid tetraethyllead product desired. Alternatively, if desired, the so-treated reaction mass can be steam distilled for separation of further quantities of tetraethyllead.

As already indicated, a prime characteristic and advantage of the present process is that anti-agglomerant additives, heretofore though necessary or almost essential for effective operations, can be greatly reduced or entirely eliminated in the present process. The benefits derived from this elimination is not only that the costs of such additives is avoided, but in addition an appreciable reduction in subsequent smelting operation temperature will be made possible. Heretofore, smelting operations have been conducted at temperatures of the order of 1100° C., which is indeed surprising since melting point of the lead residue of a reaction mass (after separation of the tetraethyllead) is only 327° C. In fact, the employment of smelting temperatures of the order of above 1000° C. is particularly disadvantageous because at such temperatures lead has a significant vapor pressure and is more easily lost in furnace gases or oxidized or otherwise chemically reacted and made unavailable for easy recovery.

As already described, the essential characteristics of the improved treating and recovery operation is providing a stream, or streams, of water having both sufficient kinetic energy and sufficient mass to assure the desired results, viz., the control of agglomerative tendencies and the initial transport of the reaction mass solids to a further recovery operation. These dual requirements, then, dictate the minimum characteristics of the operation to some extent. Thus, the employment of a very high velocity jet, with the resulting kinetic energy equal to the requirements stated above, is not in itself sufficient if the absolute mass or weight ratio stated as a secondary requirement is not achieved. The necessary ratio of aqueous liquid in terms of pounds per pound of reaction mass is not necessarily the quantity required to transport the reaction mass through a particularly extended zone, but is more than sufficient to assure movement of the reaction mass particles in contact with an aqueous phase for a sufficient period of time, of the order of a second or a fraction thereof, so that the agglomerative tendency is controlled. By control of agglomerative tendency is meant not that the tendency to agglomerate is eliminated, but that the frequent tendency to form large particles and/or caked masses, is eliminated. As a matter of fact, some limited degree of agglomeration of very fine particles, originally present in the reaction mass, to somewhat larger particles, is, in fact desirably achieved, so that the average distribution of sizes is more restricted. Generally, it is found that the present process provides particles having a size range wherein a preponderance of the particles vary from about 0.01 to about 0.17 inch maximum dimension.

In many instances, as will be clear from examples given below, further introduction of a water phase is desirable for sluicing the solids, particularly if an extended conduit is employed to transport the reaction mass solids to a recovery operation relatively remote from the reaction or synthesis step.

The aqueous phase employed in the present improvement can be free of anti-agglomerant materials although occasionally minor amounts will be provided. The presence of dissolved inorganic materials which may be already existant in the heterogenous system is not disadvantageous. Thus, in many instances, it will be quite practical to employ a recycle aqueous stream which contains sodium chloride because of a previous history of contact with reaction mass and accordingly solution of the salt therein in the aqueous phase. However, some fresh aqueous liquid or water must always be employed at some stage in overall operations to segregate the sodium chloride content of a reaction mass from the lead metal portion.

The invention will be clearly understood by reference to the following detailed description and to the accompanying figure which schematically illustrates typical apparatus.

Referring to the figure, the principal units of apparatus customarily employed includes a reactor 11 shown in part, a "drop leg" 16 enclosed by a discharge conduit 17, a mixing section 18 at the terminus of the "drop leg" portion 16, a transfer conduit 30, and a receiving-separating hopper 36. The hopper 36 is connected to a further recovery apparatus by a feed port 45, the further recovery apparatus being in many instances an extrusion apparatus 46.

Attached to the autoclave 11 is a valve 12, which may be of the type such as described in Stecher patent U.S. 2,170,353. Handwheels $13_1$, $13_2$ are provided to open the autoclave 11 and allow for discharge of the reaction mass upon completion of a reaction.

A main water line 20 fitted with a control valve 21, is provided to feed an aqueous stream 27 into the mixing section 18. In addition, a primary jet or velocity jet line 22, having a control valve 23, also feeds water or aqueous solution 28 into the mixing section 18, this line being preferably located to feed liquid 28 into the liquid 27 from the main line 20. In addition, a washing jet line 24, fitted with a control valve 25, is located to provide a stream of water or aqueous solution into the discharge conduit 17, through a plurality of jets 26 spaced peripherally around the interior of the discharge conduit 17.

The transfer conduit 30 is desirably slightly inclined in this instance about 10° from the horizontal and leads into the receiving hopper 36. Desirably, but not essentially, at some intermediate point in the transfer conduit 30, a supplemental liquid line 32, having a control valve 33, is provided to introduce supplemental amounts of aqueous liquid 34 into the stream 31 which flows through the conduit 30.

The receiving hopper is fully enclosed, to prevent contact of the atmosphere with the materials being processed, and to prevent escape of any toxic vapors. An overflow line 37 is provided from the body of the hopper 36, with an overflow valve 38 therein. A portion of the hopper walls is composed of a screen member 41, which acts as a separating septum dividing the hopper space proper from a sump space defined by a sump box 42 whose limits correspond to the size of the screen member 41. From the sump 42 is a line or conduit 43 having a control valve 44 therein for discharging the liquid.

In installations wherein the present invention supplies material to a further recovery operation of the extrusion type as illustrated, the feed port 45 connects the hopper 36 with a barrel of an extruder 46. The barrel is terminated by a die containing section 48, and a reciprocable ram 47 is provided for processing the material fed.

In the operation of the process employing apparatus as generally described above, upon completion of the reaction the valve 12 is opened and reaction mass 15 is discharged through the nozzle section 16 and into the mixing section 18. Concurrently a stream of water is admitted through the main water line 20, and is supplemented by a relatively high velocity flow of water 28 through the primary jet 28 provided through a high velocity jet line 22. Water can also be introduced through the jets 26 located in the drop leg 17. The confluence of these several aqueous streams (merging as one) and the reaction mass occurs in the mixing section 18, and under the influence of the lateral movement of the water the reaction mass particles are treated and moved into the transfer conduit 30. As already stated, sufficient kinetic energy is provided so that adequate mixing exists so that the discrete particles of reaction mass generally are individually contacted and treated with water and in this operation the tendency of the particles to agglomerate is properly controlled. As a result the mixture 31 actually introduced into the transfer conduit 30 is a heterogeneous system of sub-divided lead solids having very little agglomerative tendency and susceptible to flow under the hydraulic influence of the aqueous streams. In those instances wherein the inclination of the transfer conduit 30 is quite low, or when the extent of the line is appreciably high, a supplemental stream of water is provided by the supplemental jet line 32. It will be noted, however, that this supply of water is primarily to add bulk to the system, rather than to provide a treating action. Because of the difference in density of the predominantly lead solids and most aqueous solutions used for the process, the "slippage" or tendency of the liquid phase to advance at a more rapid rate than the solids is quite pronounced and this is counteracted in large part by the use of a supplemented stream of water as indicated.

Upon receipt of the heterogeneous liquid solid system in the hopper 36, stratification occurs and there is formed an aqueous layer 39 and a sludge, or concentrated sludge layer 40. The latter includes the solids and the adherent or accompanying tetraethyllead produced in the reaction resulting in the reaction mass. A particular feature of the process is that a septum 41 is provided forming one of the walls of the receiving vessel or hopper 36 and this provides an opportunity for accumulation of displaced liquid tetraethyllead. It has been heretofore discovered that under the influence of an aqueous stream, the tetraethyllead forming a respectable portion of a dry reaction mass can be displaced, at least in part, as a discrete liquid phase, and the sump 42 provides apparatus suitable for its collection. The tetraethyllead is intermittently or continuously, as desired, withdrawn from the sump compartment 42 through the line 43 and transferred to subsequent storage or further processing operation.

As already indicated, the aqueous phase supplied through the main liquid line 20 and the supplemental or jet line 22 can be a recirculated stream containing some dissolved sodium chloride. In many instances this is particularly beneficial in that the sodium chloride increases the specific gravity of the liquid phase which in turn facilitates the lateral movement of the solids by reducing the difference in densities of the liquid and solid phases. Thus, a preferred embodiment includes the use of a recirculated sodium chloride aqueous solution for the liquid phase. The solution, however, should not be completely saturated with sodium chloride since it is desirable to dissolve the sodium chloride which forms a considerable portion of the reaction mass.

A specific working example of the process is as described below. To provide the "feed," or reaction mass processed according to the present invention, the following procedure was used. A charge of 14.5 parts by weight of mono sodium lead alloy (10% by weight sodium, 90% by weight lead) was fed into the reactor 11 in comminuted form. Liquid ethyl chloride was then fed into the reactor and the reaction mixture agitated while the reaction was conducted at a temperature of from about 100 to 105° C. and at a pressure of about 90 pounds per square inch gauge. The proportions of ethyl chloride added, during a finite feed period, were about 6.8 parts by weight. Upon completion of the reaction most of the excess ethyl chloride was vented from the reaction zone. The reaction mass left within the reactor had the following approximate composition:

| Component: | Weight percent |
|---|---|
| Tetraethyllead | 24 |
| Lead | 55 |
| Sodium chloride | 20 |
| Ethyl chloride | About 1 |

Following the foregoing preparation of reaction mass, a typical treatment (run 4) according to the present invention was as follows. The reaction mass was discharged at the rate of about 200 pounds per minute, per square foot of transverse area of the drop leg 16. A stream of water, with no additives, was fed to the chamber 18 through the line 22 forming the primary jet 28. The velocity of this stream was approximately 34.1 feet/second, and the kinetic energy or velocity head, was 35 foot pounds per pound of reaction mass. Supplemental amounts of water were added through line 20, a total of 6.5 pounds of water per pound of reaction mass being provided by those two streams. The velocity of the water in the secondary stream 27 from the line 20 was so low that the kinetic energy contribution was negligible compared to the kinetic energy provided by the primary jet 28.

As a result of the foregoing conditions, the reaction mass solids were apparently all contacted wth the water before the reaction mass had come into contact with any solid surfaces of the chamber 18 or the transfer conduit 30. The flow of water provided ready transport of the solid particles from the mixing section 18 along the transfer conduit 30 to the receiver 36. The particles exhibited little tendency to mutually adhere or agglomerate into larger particles, although, as already stated, the treatment did provide a "leveling out" of the particle size distribution. In other words, the amount of very fine particles in the reaction mass as formed was minimized by the controlled agglomeration of the present process into slightly larger, easily transportable particles.

A number of similar batches of reaction mass, prepared as above described were made and treated under various conditions, and these operations are shown in the accompanying table.

The first six of the runs listed in the table below illustrate operations generally wherein the kinetic energy level per pound of reaction mass was maintained relatively low and the absolute weight of water added per pound of reaction mass gradually increased. These examples show that a kinetic energy level of about 30 foot pounds per pound of reaction mass is required, as below this level the reaction mass is not properly treated and agglomeration of the solids particles occur which also produces improper transport of the said mass from the mixing section despite the absolute weight ratio of water per pound of reaction mass added to the system. Thus, the absolute weight ratio of water per pound of reaction mass is maintained constant in run 1 and 2 and the kinetic energy per pound of reaction mass is varied. It is seen that in run 1 with a kinetic energy level of 41.7 foot pounds, there was provided good transport. In contrast, in run 2, with a kinetic energy level of only 14 foot-pounds, the solids were sticky, tended to agglomerate severely, and effective operation was thus prevented. Similar comparison of the paired runs 3 and 4, and 5 and 6 wherein the weight proportions of the water were constant within the pair, show the importance of providing kinetic energy of at least 30 foot pounds per pound of reaction mass. In those runs wherein the kinetic energy level was maintained below 30 foot pounds per pound of reaction mass, when the reaction mass descended into contact with the jet of water its descent was relatively unimpeded and the reaction mass particles remained in close association and were not effectively dispersed. In those runs wherein the kinetic energy level was maintained above 30 foot pounds the reaction mass was rapidly distributed and the particles thereof dispersed and mixed with water when it came into contact with the jet water stream.

In the series of runs 7–10, inclusive, the weight proportions of water to reaction mass were varied in an appreciably lower range than in the series 1–6, inclusive. The series show that a minimum quantity of water is essential, even though the kinetic energy provided is appreciably above the minimum level. Thus, in runs 8 and 9, although the kinetic energy applied was 102 and 149 foot pounds per pound of water respectively, effective transport was not achieved since the weight ratio of water to reaction mass was less than 3.2. The descent of the reaction mass was substantially unchecked as it came into contact with the jet stream of water and there was little or no dispersion of the particles of the reaction mass. Much of the sludge, particularly the metallic lead tended to accumulate or agglomerate within the mixing section. Agglomeration of the metallic lead particles also occurred within the conduit. After a short time the mixing section was completely blocked by cumulation of metallic lead. In contrast runs 7 and 10 show that as the descending reaction mass came into contact with the stream of water from the jet its fall was broken and the particles thereof rapidly separated and dispersed, mixed with water and transported from the mixing section into the conduit, and then into the hopper. There was little or no agglomeration of the metallic lead particles in any portion of the system. The difference between the results obtained in the two paired runs show that it is essential to provide an absolute weight ratio of water to reaction mass of at least about 3.2 pounds per pound of reaction mass.

In each of the runs 11–16 it will be observed that the operating conditions are well above the minimum requirements necessarily required for satisfactory treating and transport of the reaction mass and in each of these runs the treating and transport operation was quite satisfactory. There was little or no agglomeration of the metallic lead particles and in each instance the descent of the reaction mass was substantially broken by the jet stream of water and the component particles of the reaction mass separated or dispersed, mixed with water and transported from the mixing section and into the conduit, then to the hopper smoothly and efficiently. It will be understood from the foregoing that satisfactory treating and sluicing of a reaction mass is readily obtained so long as values greater than these minimum dual requirements of kinetic energy and absolute weight ratio of water to reaction mass are maintained. Generally, however, it has been found preferable to provide a kinetic energy level of about 75 to about 120 foot-pounds per pound of reaction mass and simultaneously an absolute weight of water to reaction mass of from about 5 to 6 pounds.

Table

| Run No. | Kinetic Energy, Foot Pounds per Pound of Reaction Mass | Absolute Weight of Water, Pounds per Pound of Reaction Mass | Remarks |
| --- | --- | --- | --- |
| 1 | 41.7 | 4.17 | No agglomeration—transported readily. |
| 2 | 14 | 4.17 | Agglomeration—failed to transport properly. |
| 3 | 20 | 6.7 | Do. |
| 4 | 35 | 6.5 | No agglomeration—transported readily. |
| 5 | 27.6 | 9.2 | Agglomeration—failed to transport. |
| 6 | 32 | 9.2 | No agglomeration—transported readily. |
| 7 | 66.5 | 3.4 | Do. |
| 8 | 102 | 2.6 | Agglomeration—poor transport. |
| 9 | 149 | 3.08 | Agglomeration—failed to transport. |
| 10 | 188 | 3.4 | No agglomeration—transported readily. |
| 11 | 75 | 5.0 | No agglomeration—physical characteristics of metallic sludge particles non sticky—coarse and granular. |
| 12 | 117 | 5.85 | (Same as Run 11.) |
| 13 | 84 | 4.15 | No agglomeration—transported readily. |
| 14 | 74 | 5.4 | (Same as Run 13.) |
| 15 | 59 | 5.85 | Do. |
| 16 | 75 | 7.5 | Do. |

It will be quite apparent from the foregoing that many variations may be made in the process without departing from the spirit and scope of the invention. As shown above, the dual requirements of the process are a minimum kinetic energy level requirement of at least about 30 foot pounds per pound of reaction mass and in addition thereto, an absolute quantity of aqueous liquid of at least about 3.2 pounds per pound of reaction mass. The manner in which the liquid is applied to the reaction mass is not critical as long as these two minimum requirements are met. In substantially all forms of the invention at least a portion of the aqueous stream is applied to the reaction mass in the form of a jet stream impinging on the reaction mass generally at right angles to the direction of movement of the latter. Effective treating by the present process separates and mixes the reaction mass particles, providing the desired reduction of the agglomerative tendencies of the solids, and, in addition, expediting at least partial solution of the sodium chloride content.

As already mentioned, after treating the reaction mass additional quantities of aqueous liquid may be added to the process, if desired, as supplemental liquid for extended transport of the treated reaction mass. This supplemental liquid may vary dependent upon the angle of inclination of the conduit with the horizontal, and upon the distance through which the treated mass is to be transported. Thus, the supplemental liquid for extended transport of the reaction mass may be omitted entirely when the conduit angle is appreciable or when the distance is moderate, i.e., of the order of 10 to 15 feet. On the other hand, when the angle of the conduit is only a few degrees, and the conduit length is, say, of the order of 20 or more feet, then supplemental liquid addition will frequently be required.

I claim:
1. A process for the treatment and transport of a reaction mass exhibiting a tendency to strongly agglomerate in the presence of water, said reaction mass comprising a preponderance of lead, tetraethyllead, minor quantities of ethyl chloride, and sodium chloride in proportions of about one-fifth of the reaction mass by weight, and being substantially dry and granular in appearance, comprising freely dropping said mass through a vertical conduit, con- tacting the descending mass near the terminus of the said conduit with a stream of aqueous liquid directed at substantially right angles to the direction of fall, said aqueous liquid being selected from the group consisting of water and a non-saturated sodium chloride solution capable of dissolving the sodium chloride in the reaction mass, said contacting occurring prior to contact of the descending reaction mass with any solid surface, and said aqueous liquid stream having a kinetic energy level of from about 30 to about 120 foot pounds per pound of reaction mass and being supplied at a rate of at least about 3.2 pounds of aqueous liquid per pound of reaction mass, thereby forming a heterogeneous mixture of the reaction mass and aqueous liquid wherein the reaction mass solids are adjusted in agglomeration characteristics so that non-sticky, granular particles predominate, and then passing said mixture through a substantially straight conduit inclined to the horizontal, to a receiving zone.

2. The process of claim 1 further defined in that the aqueous liquid is supplied at a rate from at least about 3.2 to about 6 pounds of aqueous liquid per pound of reaction mass.

References Cited in the file of this patent
UNITED STATES PATENTS

| | | |
|---|---|---|
| 321,573 | Boschke | July 7, 1885 |
| 1,390,230 | Bates | Sept. 6, 1921 |
| 1,907,701 | Amick et al. | May 9, 1933 |
| 2,038,703 | Bake et al. | Apr. 28, 1936 |
| 2,622,093 | Blitzer et al. | Dec. 16, 1952 |